United States Patent [19]

Kato et al.

[11] Patent Number: 5,030,512
[45] Date of Patent: Jul. 9, 1991

[54] MAGNETO-OPTICAL RECORDING MEDIUM

[75] Inventors: Yoshimine Kato, Mitaka; Teruhisa Shimizu, Tokyo; Shinji Takayama, Mitaka; Hiroshi Tanaka, Tokyo, all of Japan

[73] Assignee: International Business Machines Corporation, Armonk, N.Y.

[21] Appl. No.: 551,973

[22] Filed: Jul. 12, 1990

[30] Foreign Application Priority Data

Sep. 20, 1989 [JP] Japan ................... 1-242422

[51] Int. Cl.$^5$ .............................. G11B 7/24
[52] U.S. Cl. ................... 428/336; 428/694; 428/900
[58] Field of Search ............ 428/694, 900, 336

[56] References Cited

U.S. PATENT DOCUMENTS 4,814,053  3/1989  Shimokawato ............... 204/192.15
4,838,962  6/1989  Takayama et al. ............ 428/928

FOREIGN PATENT DOCUMENTS 0333467  9/1989  European Pat. Off. .
130344   5/1989  Japan .
130345   5/1989  Japan .

OTHER PUBLICATIONS

"Photomagnetic Recording Medium for Compensation Point Writing" Kogyo & Kimura, 5/9/85, 48 P 423.
"Magneto-Optical Properties of Nd-Co & Nd-Fe Alloys" McGuire et al., J. Appl. Physics, 61(8), Apr. 15, 1987.
"Exchange Coupled Magneto-Optic Layers" Gambino et al., IEEE Transactions on Magnetics, vol. 24, No. 6, Nov. 1988.

Primary Examiner—Merrell C. Cashion, Jr.
Attorney, Agent, or Firm—Douglas R. Millett

[57] ABSTRACT

A first and a second magnetic layer are deposited on a substrate. The first magnetic layer has high magneto-optical effect at short wavelengths, but low perpendicular anisotropy. The second magnetic layer has low magneto-optical effect at short wavelengths, but high perpendicular anisotropy. The magnetic exchange coupling between the two magnetic layers results in a recording medium which has strong perpendicular anisotropy and high magneto-optical effect, even at short wavelengths.

18 Claims, 5 Drawing Sheets

MAGNETO-OPTICAL RECORDING MEDIUM

BACKGROUND OF THE INVENTION

1. Field of the Invention

This invention relates to a magneto-optical recording medium for recording information by use of a laser beam, and particularly to a magneto-optical recording medium which has a high magneto-optic effect under a short-wavelength light and is suitable for high-density recording.

2. Description of the Prior Art

Magneto-optical recording has been put to practical use through a rewritable optical recording approach. Until now, a single amorphous rare-earth-transition-metal film with a strong magnetic anisotropy in the direction perpendicular to the film surface has been used as a magneto-optical recording film. In particular, TbFeCo alloy system amorphous films have been researched and developed for practical use. In magneto-optical recording, there is a trend toward higher recording density, and use of a short-wavelength read/-write light is now being researched as a possible approach. For this purpose, the development of magneto-optical materials with higher magneto-optic effects (Kerr rotation and Faraday rotation) is essential in order to achieve higher density magneto-optical recording in the future.

However, in the conventional TbFeCo alloy series amorphous film, as the wavelength of the laser beam becomes shorter, the magneto-optic effect tends to decrease monotonically. Thus, a sufficiently large Kerr rotation angle or Faraday rotation angle cannot be obtained at short wavelengths, and thus there is a problem that the output in reading with the laser beam decreases greatly. It was recently proposed that a two-layer film be used as a new magneto-optical film with magnetic exchange coupling between layers (for example, see Japanese Published Unexamined Patent Application No. 60-171652). However, since these are also substantially TbFe alloy system laminated films, the Kerr rotation angle decreases at short wavelengths. They are therefore unsuitable for read/write films at short wavelengths.

On the other hand, a rare-earth-transition-metal amorphous film consisting mainly of Nd or Pr is known (for example, see T. R. McGuire et al., "Magneto-optical Properties of Nd-Co and Nd-Fe alloys", J. Appl. Phys. 61 (1987) pp. 3352-3354). Although this film has a characteristic higher magneto-optical effect at short wavelengths, it is not a perpendicular magnetized film with strong magnetic anisotropy in the direction perpendicular to the film surface, but merely an in-plane magnetized film with strong magnetic anisotropy in the direction parallel to the film face. Thus, high-density recording cannot be attained.

SUMMARY OF THE INVENTION

An object of the invention is to provide a magneto-optical recording medium which has a sufficiently high magneto-optic effect even at short wavelengths and strong magnetic anisotropy in the direction perpendicular to the film surface, and permits high-density recording.

A first and a second magnetic layer are deposited on a substrate. The first magnetic layer has high magneto-optical effect at short wavelengths, but low perpendicular anisotropy. The second magnetic layer has low magneto-optical effect at short wavelengths, but high perpendicular anisotropy. The magnetic exchange coupling between the two magnetic layers results in a recording medium which has strong perpendicular anisotropy and high magneto-optical effect, even at short wavelengths.

For a fuller understanding of the nature and advantages of the present invention reference should be made to the following detailed description taken in conjunction with the accompanying drawings.

DESCRIPTION OF THE PREFERRED EMBODIMENTS

Figure 1:
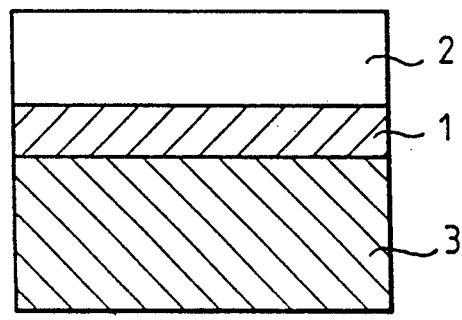
FIG. 1 is a cross-sectional view of an embodiment of the magneto-optical recording medium.

The proposed magneto-optical recording medium has a first magnetic layer laminated on a second magnetic layer. The first magnetic layer is of a (Nd, Pr)- transition-metal amorphous alloy having high magneto-optical effect at short wavelengths but low perpendicular anisotropy. The second magnetic layer is of a (Tb, Dy)-transition-metal amorphous alloy systems, having low magneto-optical effect at short wavelengths but high perpendicular anisotropy. By exerting magnetic exchange coupling between these two layers, strong perpendicular anisotropy is induced in the first layer, and a perpendicular magnetized magneto-optical recording medium is obtained that has overall high magneto-optical effect, even at short wavelengths.

The first magnetic layer of the proposed magneto-optical recording medium is a rare-earth-transition-metal amorphous film whose composition is expressed by a general formula $(A_{1a}B_a)_l(Fe_bCo_{1-b})_mT_n$, wherein A is at least one element selected from a light rare-earth element group consisting of Nd and Pr, B is at least one element selected from a group of heavy rare-earth elements, and T is at least one element selected from a group of transition-metal elements for increasing corrosion resistance, $0 \leq a \leq 0.5$, $0 \leq b \leq 1$, and in atomic percentage, $10 \leq l \leq 50$, $50 \leq m \leq 90$, $0 \leq n \leq 15$, and $l + m + n = 100$.

Nd and Pr are specifically selected as light rare-earth elements for A, since they have the effect of making the Kerr rotation high at short wavelengths. Note that the first magnetic layer is mainly composed of these light rare-earth elements. Addition of a heavy rare-earth element to the light rare-earth elements Nd and Pr in the first magnetic layer facilitates magnetic exchange coupling between the first layer and the second layer, makes it easier to obtain a perpendicular magnetized film, and makes the shape of the written magnetic domain uniform to achieve a secondary objective of reducing medium noise due to magnetic domain shape. Heavy rare-earth elements for such purposes can be selected from typical heavy rare-earth elements such as Tb, Dy, Gd, Ho, and Er. Alternatively, heavy rare-earth elements may be absent. A transition-metal element such as Ti, Zr, V, Nb, Ta, Cr, Mo, W, Pd, Pt, or Al known to have the property of increasing corrosion resistance can be selected specifically for T.

The second magnetic layer is a rare-earth-transition-metal amorphous film whose composition is expressed by a general formula $R_xM_yU_z$, wherein R is at least one element selected from an element group consisting of Tb and Dy, M is at least one element selected from an element group consisting of Fe and Co, and U is at least one element selected from a group of transition-metal elements for increasing corrosion resistance, and in atomic percentage, $15 \leq x \leq 35$, $65 \leq y \leq 85$, $0 \leq z \leq 15$, and $x+y+z=100$. In order to obtain higher magnetic anisotropy, higher corrosion resistance, and higher performance in recording and writing, the preferable composition is $20 \leq x \leq 30$, $70 \leq y \leq 80$, and $0 \leq z \leq 10$, either on the transition-metal rich side where the sublattice magnetization of transition metals is predominant, with the Curie temperature Tc being 150° C. to 250° C., or on the rare-earth rich side where the sublattice magnetization of the rare earth element is predominant, with the Curie temperature Tc as above, and the compensation temperature 50° C. to 150° C. A transition metal similar to the above T can be selected for U.

In order to obtain a film suitable for magneto-optical recording which behaves like a perpendicular magnetized film with a coercive force of 1 kilo Oersted (kOe) or more as a whole by laminating the first magnetic layer and the second magnetic layer alternately to utilize magnetic exchange coupling, it is preferable to set the ratio $(t_1/t_2)$ of the total film thickness $(t_1)$ of the first magnetic layer to the total thickness $(t_2)$ of the second magnetic layer to 0.5 or less, more preferably in the range 0.001 to 0.2, so that the magnetic exchange coupling may be exerted on the entire first magnetic layer.

Arrangement of a thermal diffusion film made of a material such as metal, alloy, or ceramic with a high heat conductivity on the proposed multilayer magnetic film, either directly or through a transparent dielectric protective film, gives an optical recording medium with higher performance suitable for higher speed writing.

Embodiment 1

Figure 2:
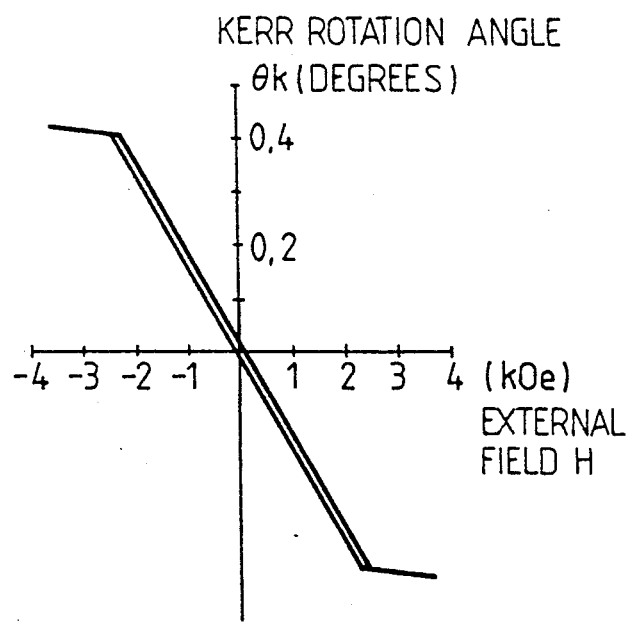
FIG. 2 is a Kerr loop diagram of the $Nd_{20}Co_{80}$ single layer film.
Figure 3:
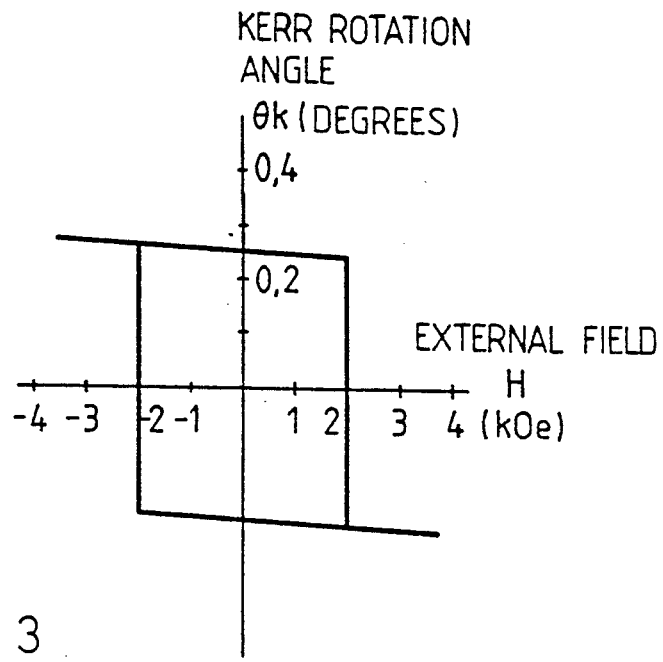
FIG. 3 is a Kerr loop diagram of the $Tb_{25}Fe_{75}$ single layer film.
Figure 4:
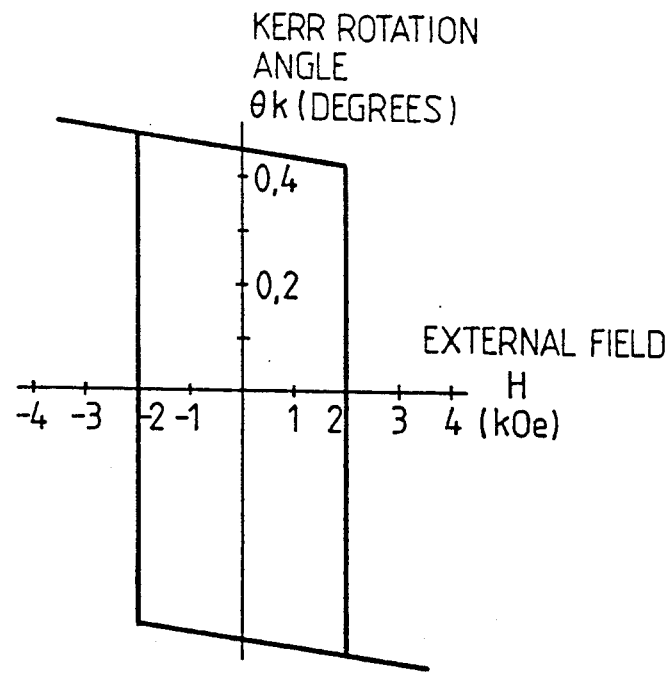
FIG. 4 is a Kerr loop diagram of the $Nd_{20}Co_{80}/Tb_{25}Fe_{75}$ laminated film.

FIG. 1 shows the sectional structure of the laminated film of an embodiment of the invention. On substrate 3, made of glass or plastic, a 100-angstrom-thick in-plane magnetized film 1 of $Nd_{20}Co_{80}$ was deposited as a first magnetized layer by a known sputtering process or vacuum deposition method, and on top of that a 1000-angstrom-thick perpendicular magnetized film 2 of $Tb_{25}Fe_{75}$ was deposited as a second magnetic layer. FIGS. 2 to 4 show the measured Kerr hysteresis loops of an $Nd_{20}Co_{80}$ single-layer film, a $Tb_{25}Fe_{75}$ single-layer film, and the laminated film of this embodiment, respectively. For the measurement of these Kerr hysteresis loops, an He-Ne laser beam of 630 nm in wavelength was used.

As shown in FIG. 2, with respect to the $Nd_{20}Co_{80}$ single-layer film, the obtained Kerr rotation angle is large but the perpendicular anisotropy is low. The latter property is shown by the fact that the coercive force is small and the loop lies almost obliquely.

As shown in FIG. 3, the obtained Kerr rotation angle is small with respect to the $Tb_{25}Fe_{75}$ single-layer film, but the perpendicular anisotropy is high. The latter property is shown by the large coercive force and the loop intersecting the H axis nearly at right angles, that is, by good squareness.

FIG. 4 shows a Kerr loop diagram for the film of the present invention. A perpendicular magnetized film suitable for magneto-optical recording is obtained with good squareness of 2 kOe in coercive force and a large Kerr rotation angle in this embodiment. Such properties are considered to result from the magnetic exchange coupling between the two layers. In this connection, magnetic exchange coupling has been reported in some papers. However, no case has been reported where the lowness of the perpendicular anisotropy of a first film is covered by magnetic exchange coupling with a second film without a change in the magnitude of the magneto-optic effect of the first film. In Japanese Published Unexamined Patent Application No. 60-171652, for example, no more than an attempt to stabilizing pits by composing the recording film of two layers is disclosed.

Figure 5:
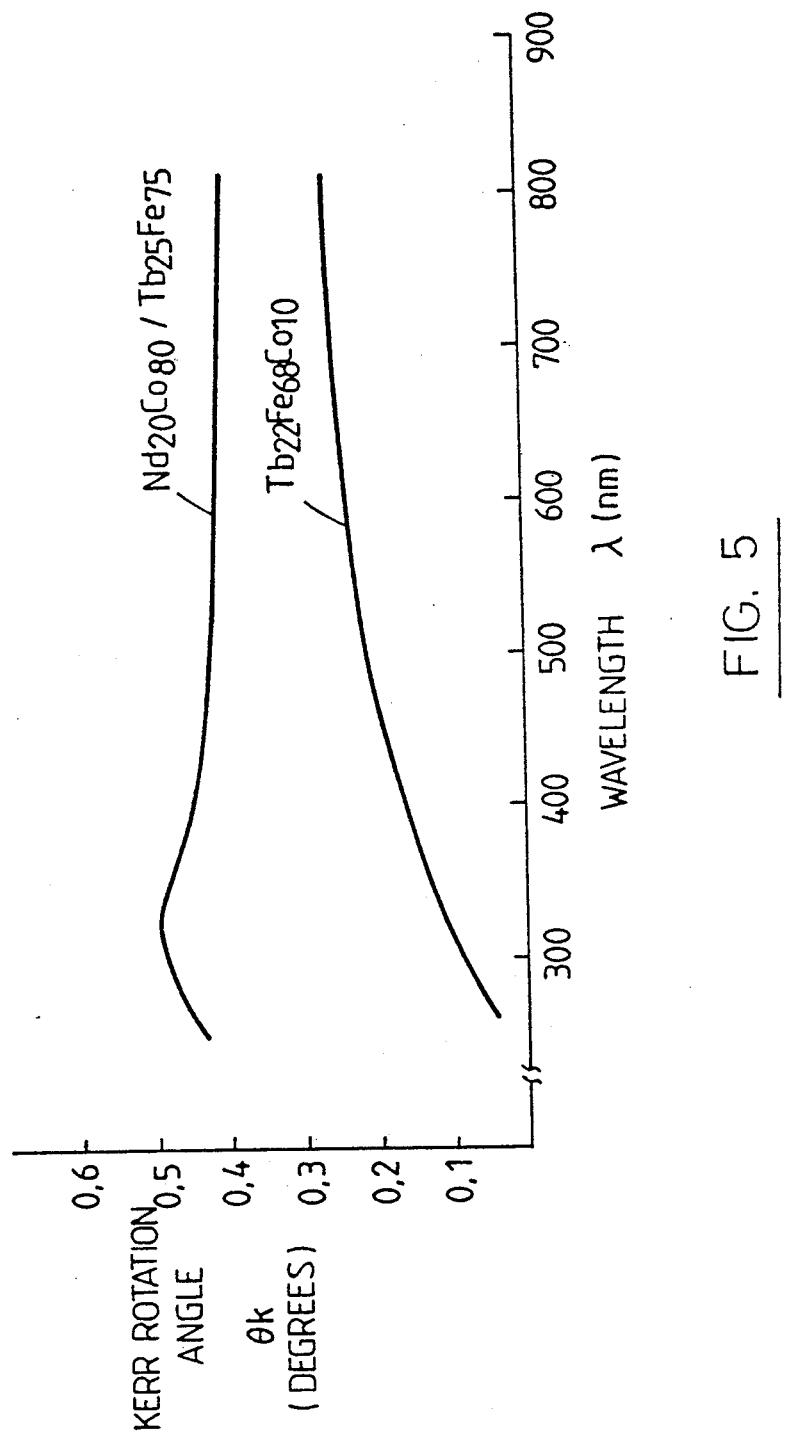
FIG. 5 is a graph showing the relationship between the wavelength of the laser beam and the Kerr rotation angle for the $Nd_{20}Co_{80}/Tb_{25}Fe_{75}$ laminated film.

FIG. 5 compares the dependence on the wavelength of the Kerr rotation angle $\theta k$ of the invented multilayer film and that of the amorphous film of the conventional material, $Tb_{22}Fe_{68}Co_{10}$. As is apparent from the figure, this multilayer film has a much larger Kerr rotation angle than the conventional material, even at a wavelength of 500 nm, and therefore high-density recording with a short wavelength laser beam gives a high read output.

Figure 6:
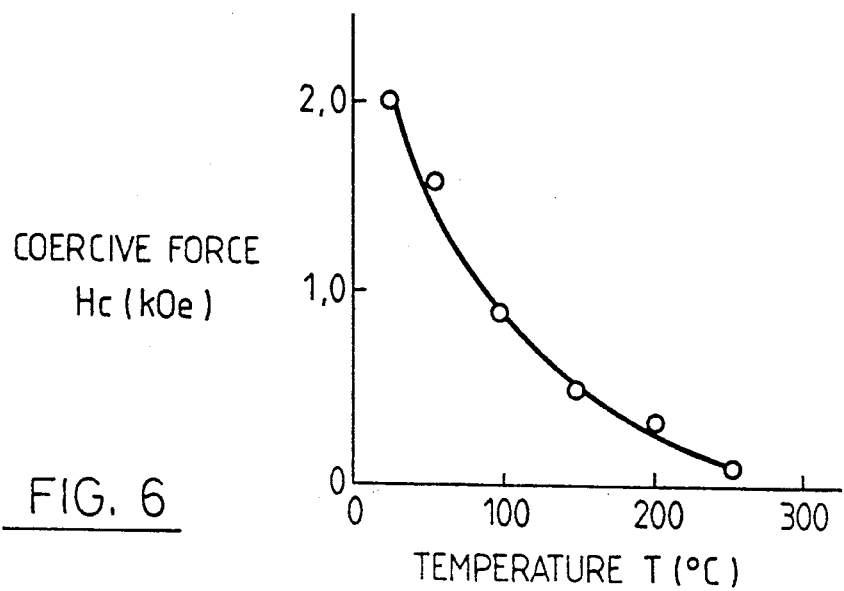
FIG. 6 is a graph showing the relationship between the temperature and the coercive force for the $Nd_{20}Co_{80}/Tb_{25}Fe_{75}$ laminated film.
Figure 7:
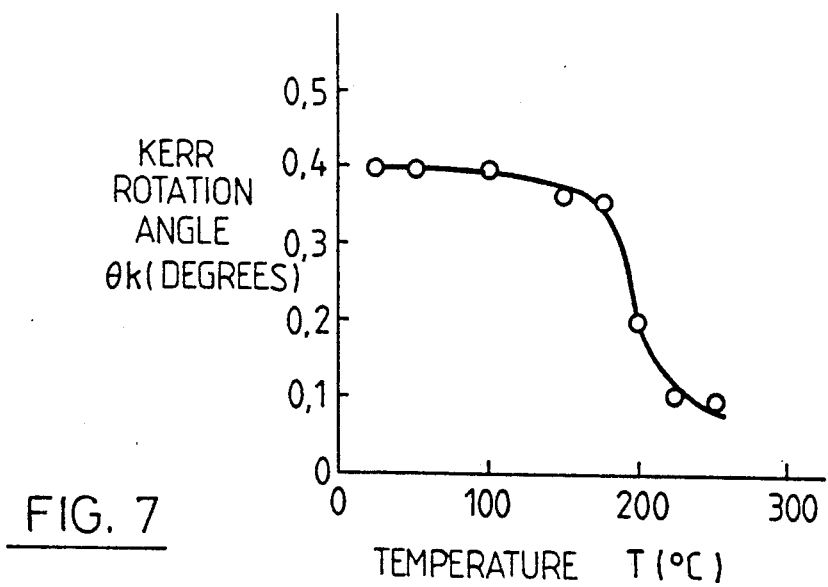
FIG. 7 is a graph showing the relationship between the temperature and Kerr rotation angle for the $Nd_{20}Co_{80}/Tb_{25}Fe_{75}$ laminated film.

FIGS. 6 and 7 show the dependence of the coercive force Hc and the Kerr rotation $\theta k$ of the double-layer film on the angle can be obtained even at high temperatures, the drop of output is low even if the temperature of the film is elevated by the laser beam at the time of reading, resulting in a high signal to noise ratio. The value shown as the Kerr rotation angle in the graph at a wavelength Xnm is the value of the Kerr rotation angle obtained by reading with a laser beam of wavelength Xnm after recording with a laser beam of the same wavelength Xnm. In the experiment, the data were collected while the wavelength of the laser beam was continuously varied.

Embodiment 2

On a polycarbonate substrate is formed a laminated film consisting of a 400-angstrom-thick silicon nitride film, a 200-angstrom-thick $Nd_{20}(Fe_{0.8}Co_{0.2})_{80}$ amorphous film, a 2000-angstrom-thick $Tb_{22}Fe_{68}Co_{10}$ amorphous film, a 1000-angstrom-thick silicon nitride film, and a 1000-angstrom-thick Al film to provide a perpendicular magnetized film with good squareness, as in Embodiment 1. Even at a wavelength of 500 nm, the Kerr rotation does not deteriorate, and the Kerr rotation angle of 0.75 degree is measured from the PC substrate side. The coercive force is as large as 10 kOe, and the material is suitable for practical magneto-optical recording.

Embodiment 3

On a glass substrate is formed a laminated film comprising a 450 angstrom-thick silicon nitride film, a 20-angstrom-thick $Nd_{40}(Co_{0.5}Fe_{0.5})_{55}Cr_5$ amorphous film, a 2000-angstrom-thick $Tb_{22}Fe_{60}Co_{10}Pt_8$ amorphous film, and a 1000-angstrom-thick aluminum nitride film to provide a perpendicular magnetized film with good squareness of 4 kOe in coercive force Hc, as in Embodiment 1. The Kerr rotation does not deteriorate even at a wavelength of 400 nm, and the Kerr rotation angle of 0.60 degree is measured from the PC substrate side.

Embodiment 4

On a polycarbonate film is formed a laminated film comprising a 200-angstrom-thick $Nd_{10}Pr_{15}Co_{72}Cr_3$ amorphous film, a 2000-angstrom-thick $Tb_{18}Fe_{65}Co_{12}Cr_5$ amorphous film, and a 1000-angstrom-thick $ZrO_2$ film to provide a perpendicular magnetized film with good squareness of 4 kOe in coercive force Hc, as in Embodiment 1. The Kerr rotation does not deteriorate even at a wavelength of 400 nm, and a value as large as 0.5 degree is obtained without interference.

Embodiment 5

On a glass substrate are laminated alternately a 20-angstrom-thick $Pr_{23}Co_{74}Ta_3$ amorphous film and a 100-angstrom-thick $Tb_{18}Fe_{65}Co_{12}Cr_5$ amorphous film to a total thickness of about 1000 angstroms. The results of the experiment ensure that a perpendicular magnetized film with good squareness of 5 kOe in coercive force Hc is obtained, as in Embodiment 1. The Kerr rotation angle is 0.45 degree at 500 nm wavelength.

Embodiment 6

On a glass substrate are successively laminated a 200-angstrom-thick $Pr_{30}Tb_{10}(Fe_{0.7}Co_{0.3})_{60}$ amorphous film, a 1000-angstrom-thick $Dy_{20}(Fe_{0.8}Co_{0.2})_{76}Nb_4$ amorphous film, and a 1000-angstrom-thick SiN film. This gives a perpendicular magnetized film with good squareness of 5 kOe in coercive force Hc, as in Embodiment 1. The Kerr rotation angle at 500 nm wavelength is as large as 0.55 degree without interference.

Embodiment 7

Figure 8:
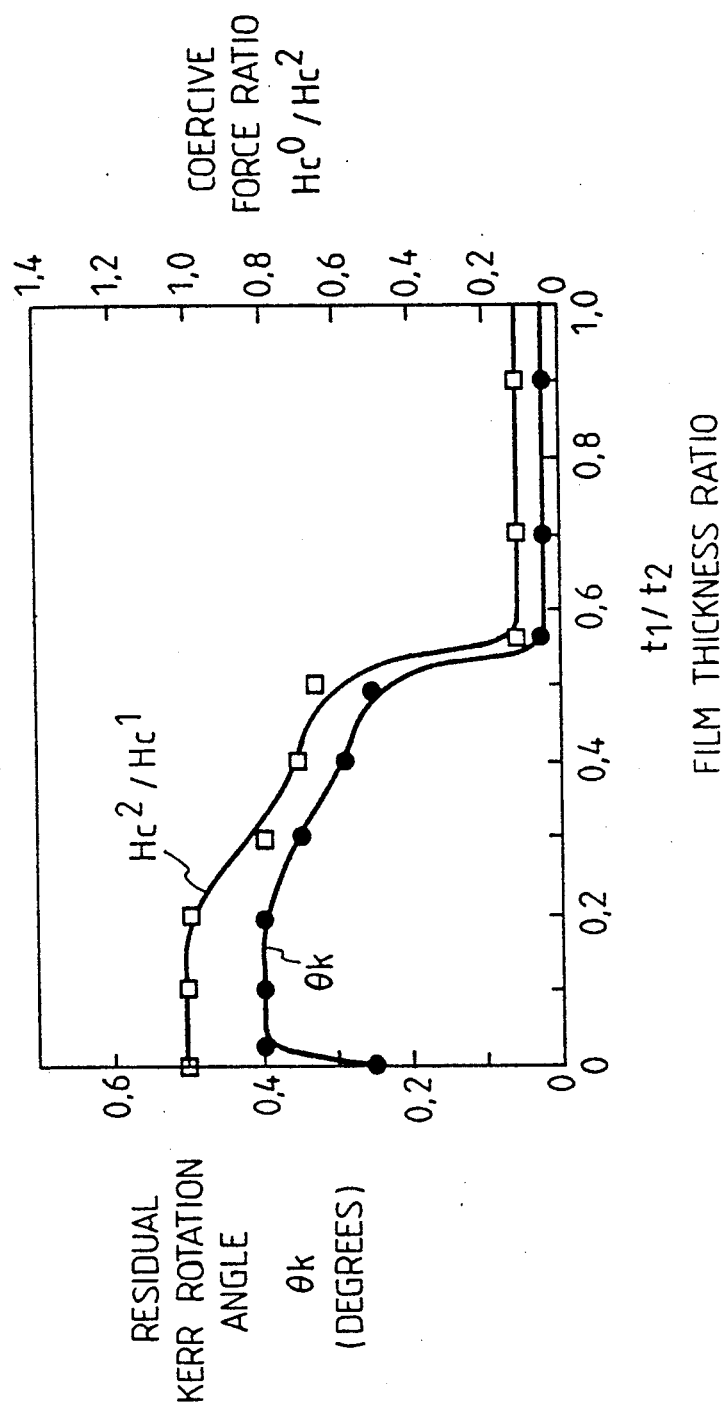
FIG. 8 is a graph showing the relationship between the ratio of coercive force $Hc_0/Hc_2$ and the film thickness ratio $(t_1/t_2)$ and the relationship between the Kerr rotation angle and the film thickness ratio $(t_1/t_2)$ for an embodiment of the invention, where the thickness of the first magnetic layer is $t_1$, the thickness of the second magnetic layer is $t_2$, the coercive force of the single second magnetic layer alone is $Hc_2$, and the coercive force of the whole laminated film is $Hc_0$.

On a glass substrate is formed a first layer of 1000-angstrom-thick $Tb_{22}Fe_{68}Co_{10}$ amorphous film, then an $Nd_{18}Tb_2(Fe_{0.7}Co_{0.3})_{80}$ amorphous film with a different thickness is laminated onto it to form nine types of double-layer film. FIG. 8 shows, based on the data obtained on the double-layer film, the residual Kerr rotation angle $\theta k$ and the ratio of the coercive force of the double layer film to that of the single second layer alone $Hc_0/Hc_2$ as a function of the film thickness ratio of the first layer to the second layer $(t_1/t_2)$ Here, the residual Kerr rotation angle is measured by using a laser beam with a wavelength of 822 nm. The ratio of the coercive force indicates good squareness. That is, it shows the extent to which the double-layer film as a whole inherits the favorable quality of the coercive force (and thus the squareness) of the second layer. As can be seen from FIG. 8, the residual Kerr rotation angle $\theta k$ has the highest values in the range of film thickness ratios from 0.001 to 0.2, while it decreases greatly when the ratio exceeds 0.5. The coercive force ratio $Hc_0/Hc_2$ significantly decreases when the film thickness exceeds 0.5. Thus, in order to obtain a perpendicular magnetized film suitable for high-density magneto-optical recording, the ratio of film thickness $(t_1/t_2)$ should be set to 0.5 or less, preferably in the range of 0.001 to 0.2.

The present invention thus provides a magneto-optical recording medium which has high magneto-optic effect even under a short-wavelength light, high anisotropy in the direction perpendicular to the film surface, and permits high-density recording.

While the preferred embodiments of the present invention have been illustrated in detail, it should be apparent that modifications and adaptations to those embodiments may occur to one skilled in the art without departing from the scope of the present invention as is set forth in the following claims.

What is claimed is:

1. A magneto-optical recording medium comprising a first magnetic layer laminated onto a second magnetic layer, the first magnetic layer being a rare-earth-transition-metal amorphous film with mainly a light rare-earth element as the rare-earth element, the light rare-earth element being at least one element selected from an element group consisting of Nd and Pr, and the second magnetic layer being a rare-earth-transition-metal amorphous film with at least one element selected from an element group consisting of Tb and Dy as the rare-earth element, wherein the ratio $(t_1/t_2)$ of the thickness of the first magnetic layer $(t_1)$ to that of the second magnetic layer $(t_2)$ is 0.001 to 0.2.

2. The medium of claim 1, wherein the first magnetic layer or the second magnetic layer includes a transition metal for increasing the corrosion resistance.

3. The medium of claim 1, further comprising a thermal diffusion layer deposited onto either the first or the second magnetic layer, the thermal diffusion layer is comprised of a high heat conductivity material.

4. A magneto-optical recording medium comprising a first magnetic layer laminated onto a second magnetic layer, the first magnetic layer being a rare-earth-transition-metal amorphous film whose composition is expressed by a general formula $(A_{1-a}B_a)_l(Fe_bCo_{1-b})_mT_n$, wherein A is at least one element selected from a light rare-earth element comprising Nd and Pr, B is at least one element selected from a group of heavy rare-earth elements consisting of Tb, Dy, Gd, Ho, and Er, T is at least one element selected from a group of transition-metal elements consisting of Ti, Zr, V, Nb, Ta, Cr, Mo, W, Pd, Pt, Au and Al, for increasing the corrosion resistance, $0 \leq a \leq 0.5$, $0 \leq b \leq 1$, and in atomic percentage, $10 \leq l \leq 50$, $50 \leq m \leq 90$, $0 \leq n \leq 15$, and $l+m+n=100$, and the second magnetic layer being a rare-earth-transition-metal amorphous film whose composition is expressed b a general formula $R_xM_yU_z$, wherein R is at least one element selected from an element group consisting of Tb and Dy, M is at least one element selected from an element group consisting of Fe and Co, U is at least one element selected from a group of transition-metal elements consisting of Ti, Zr, V, Nb, Ta, Cr, Mo, W, Pd, Pt, Au and Al, for increasing the corrosion resistance and in atomic percentage, $15 \leq x \leq 35$, $65 \leq y \leq 85$, $0 \leq z \leq 15$, and $x+y+z=100$, and wherein the ratio $(t_1/T_2)$ of the thickness of the first magnetic layer $(t_1)$ to that of the second magnetic layer $(t_2)$ is 0.001 to 0.2.

5. The medium of claim 4, further comprising a thermal diffusion layer deposited onto either the first or the second magnetic layer, the thermal diffusion layer is comprised of a high conductivity material.

6. A magneto-optical recording medium comprising a multi-layer deposited onto a substrate, the multi-layer comprising a first and a second magnetic layer, the first magnetic layer comprising $Nd_{20}Co_{80}$ and the second magnetic layer comprising $Tb_{25}Fe_{75}$, and wherein the ratio ($t_1/t_2$) of the thickness of the first magnetic layer ($t_1$) to that of the second magnetic layer ($t_2$) is 0.001 to 0.2.

7. The medium of claim 6, wherein the first magnetic layer is approximately 100 Å thick and the second magnetic layer is approximately 1,000 Å thick.

8. A magneto-optical recording medium comprising a multi-layer deposited onto a substrate, the multi-layer comprising a first and a second magnetic layer, the first magnetic layer comprising $Nd_{20}(Fe_{0.8}Co_{0.2})_{80}$ and the second magnetic layer comprising $Tb_{22}Fe_{68}Co_{10}$, and wherein the ratio ($t_1/t_2$) of the thickness of the first magnetic layer ($t_1$) to that of the second magnetic layer ($t_2$) is 0.001 to 0.2.

9. The medium of claim 8, wherein the first magnetic layer is approximately 200 Å thick and the second magnetic layer is approximately 2,000 Å thick.

10. A magneto-optical recording medium comprising a multi-layer deposited onto a substrate, the multi-layer comprising a first and a second magnetic layer, the first magnetic layer comprising $Nd_{40}(Co_{0.5}Fe_{0.5})_{55}Cr_5$ and the second magnetic layer comprising $Tb_{22}Fe_{60}Co_{10}Pt_8$, and wherein the ratio ($t_1/t_2$) of the thickness of the first magnetic layer ($t_1$) to that of the second magnetic layer ($t_2$) is 0.001 to 0.2.

11. The medium of claim 10, wherein the first magnetic layer is approximately 20 Å thick and the second magnetic layer is approximately 2,000 Å thick.

12. A magneto-optical recording medium comprising a multi-layer deposited onto a substrate, the multi-layer comprising a first and a second magnetic layer, the first magnetic layer comprising $Nd_{10}Pr_{15}Co_{72}Cr_3$ and the second magnetic layer comprising $Tb_{18}Fe_{65}Co_{12}Cr_5$, and wherein the ratio ($t_1/t_2$) of the thickness of the first magnetic layer ($t_1$) to that of the second magnetic layer ($t_2$) is 0.001 to 0.2.

13. The medium of claim 12, wherein the first magnetic layer is approximately 200 Å thick and the second magnetic layer is approximately 2,000 Å thick.

14. A magneto-optical recording medium comprising a multi-layer deposited onto a substrate, the multi-layer comprising a first and a second magnetic layer, the first magnetic layer comprising $Pr_{23}Co_{74}Ta_3$ and the second magnetic layer comprising $Tb_{18}Fe_{65}Co_{12}Cr_5$ and wherein the ratio ($t_1/t_2$) of the thickness of the first magnetic layer ($t_1$) to that of the second magnetic layer ($t_2$) is 0.001 to 0.2.

15. The medium of claim 14, wherein the first magnetic layer is approximately 20 Å thick and the second magnetic layer is approximately 100 Å thick.

16. A magneto-optical recording medium comprising a multi-layer deposited onto a substrate, the multi-layer comprising a first and a second magnetic layer, the first magnetic layer comprising $Pr_{30}Tb_{10}(Fe_{0.7}Co_{0.3})_{60}$ and the second magnetic layer comprising $Dy_{20}(Fe_{0.8}Co_{0.2})_{76}Nb_4$, and wherein the ratio ($t_1/t_2$) of the thickness of the first magnetic layer ($t_1$) to that of the second magnetic layer ($t_2$) is 0.001 to 0.2.

17. The medium of claim 16, wherein the first magnetic layer is approximately 200 Å thick and the second magnetic layer is approximately 1,000 Å thick.

18. A magneto-optical recording medium comprising a multi-layer deposited onto a substrata, the multi-layer comprising a first and a second magnetic layer, the first magnetic layer comprising $Nd_{18}Tb_2(Fe_{0.7}Co_{0.3})_{80}$ and the second magnetic layer comprising $Tb_{22}Fe_{68}Co_{10}$, and wherein the ratio ($t_1/t_2$) of the thickness of the first magnetic layer ($t_1$) to that of the second magnetic layer ($t_2$) is 0.001 to 0.2.

* * * * *